Patented Mar. 14, 1933

1,900,951

UNITED STATES PATENT OFFICE

GEORGE A. RICHTER, WALLACE B. VAN ARSDEL, AND ROGER B. HILL, OF BERLIN, NEW HAMPSHIRE, ASSIGNORS TO BROWN COMPANY, OF BERLIN, NEW HAMPSHIRE, A CORPORATION OF MAINE

MANUFACTURE OF RUBBER-IMPREGNATED PRODUCTS

No Drawing.  Application filed April 22, 1929.  Serial No. 357,332.

Rubber latex as found in nature consists of a dispersion of rubber globules in an aqueous medium or serum, the dispersion being complex in its nature in that it contains various non-rubber solids such as resins, proteins, sugars, and mineral matters. The amount of non-rubber solids associated with a latex depends upon such factors as the specie of rubber tree from which it is derived, the age of the tree, and the season of the year when the tree is tapped, but it has been found by various investigators that a rubber latex derived from the *Hevea brasiliensis* and having a total solids content of about 38% may contain 4%, more or less, non-rubber solids, the chief components of which are protein and resinous bodies. Rubber latex, therefore, in its natural condition is a crude or impure raw material in the sense that it contains a substantial amount of non-rubber solids, in addition to rubber.

There are various uses to which rubber latex is put, according to which the aqueous content of the latex is removed, leaving behind a rubber compound containing the non-rubber solids present in the original latex. For instance, rubber latex is sometimes used to impregnate porous materials, to impart desirable characteristics thereto, the use of rubber in this form sometimes being more economical and giving better results than the use of so-called rubber organic solvent solutions for this purpose, and being further advantageous in that it does away with fire hazard. It is sometimes the practice to impregnate fibrous material in the form of strand material such as cords, woven fabrics, or webs of cellulose fibers such as cotton or wood pulp, and then to dry and, if desired, to vulcanize the impregnated product to impart water repellency or other desirable characteristics thereto. When a porous web of cellulose fiber interfelted on machinery of the papermaking type is impregnated with rubber latex, then dried and, if desired, vulcanized, it is found that the product acquires characteristics including strength, stretch, tear resistance, pliability and feel, simulating those of natural leather. The closeness with which artificial leather sheetings made as herein described come to the natural product depends upon various factors, but it has been found that by choosing the appropriate fibrous base, impregnating it with latex, and then drying, it is possible to produce artificial leather sheetings eminently satisfactory for use as a substitute for the natural product in many fields. The fibrous base found most suitable is one composed of interfelted absorptive fibers, such as cotton or wood pulp refined to high alpha cellulose content, and having high porosity so that it may be rapidly and uniformly penetrated by latex diluted with water to a solids content of, say, about 15%.

Artificial leather sheetings made as hereinbefore described, whether or not the rubber is vulcanized, invariably possess a rather harsh and stiff feel, such as is sometimes present in natural leathers. For many commercial uses, harshness and stiffness in leathers are decidedly disadvantageous, but if it is attempted to do away with these characteristics as by compounding the rubber content of the sheeting with various softening or plasticizing agents such as oils or waxes, it is generally found that if sufficient of such agents be used to effect a decided softening, the strength of the sheeting is seriously impaired. We have found that harshness and stiffness in the finished product may be partly ascribed to the non-rubber solids present in the latex used for impregnation and remaining behind along with the rubber in the sheeting after the aqueous content of the latex is removed. We have further found that if non-rubber solids, including proteins and resins, are removed from the dried sheeting, it acquires a distinctly dry feel and is notably improved in strength, stretch, tear resistance, and ageing quality or stability. The removal of non-rubber solids, including proteins and resins, from the dried sheeting may be accomplished by treating it with a solution of a chemical which acts as a solvent or dispersing agent for such solids, the treatment preferably being carried out while the sheeting is being mechanically worked as by a stretching, squeezing, or kneading operation, since by so doing the non-rubber solids are caused to work to the surface, from which they may be removed by the chemical solution or during subsequent washing, and the sheeting is made remarkably flexible. The preferable chemical solution for this purpose has been found to be a caustic soda solution, the concentration of which may be from, say, about 10% to 18% NaOH, and the temperature between, say, about 32° F. and room temperature. The lower the temperature of solution, the more effective has been found to be the action of a solution of caustic soda of a given strength, indicating that the treatment might be analogous to the mercerizing action of caustic soda on cellulose. So far as we have observed, however, there is apparently no mercerizing action, for, instead of producing a spongy, puffy sheet as would be expected if mercerization occurred, the action of the caustic soda solution is to compact the sheeting somewhat. In actual practice, the sheeting may be passed through a bath of caustic soda solution under the conditions of causic soda concentration and temperature previously given, the time of contact with the bath being, say, ten minutes, whereupon the sheeting may be mechanically worked while wet with the caustic soda solution, as this tends to enhance pliability and softness of feel in the finished product, and at the same time diminish its tackiness and increase its strength. After such treatment, the caustic soda solution remaining in the sheeting should be removed by washing with water, whereupon the washed sheeting may be dried and subjected to the desired finishing treatments.

While we cannot state with precision the chemical action of caustic soda on the non-rubber solids present in rubber-impregnated sheeting, such as described, it is our theory that the caustic soda, particularly under mechanical working of the sheeting, may effect a saponification of the saponifiable resins to form soluble, soap-like compounds, and may also react upon proteins to form soluble proteinates, while at the same time the water serves to dissolve sugars and water-soluble minerals which are exposed to the action of the aqueous solution by the mechanical working. Other strong alkalies, such as caustic potash, are equivalent in their action to caustic soda, and there are other chemical solutions, such as strong solutions of zinc chloride and calcium or lithium thiocyanate, which act largely upon and dissolve the proteins, probably effecting little, if any, reaction upon the resins.

The process of the present invention may be advantageously practised when latices either in natural condition or in which the rubber globules have been vulcanized, as by the Schidrowitz process, are used as a raw material, but there is little or no advantage in carrying out the process herein described when a latex purified in the sense that non-rubber solids have been removed therefrom is used as a raw material, the globules of such latex being either in a natural or vulcanized condition. The process may also be used after a latex-treated sheet has been vulcanized. This vulcanization may be brought about either by dipping the sheet for a few minutes in a dilute solution of sulphur chloride in an inert solvent such as carbon tetrachloride or by compounding with the latex the appropriate vulcanizing ingredients such as sulphur and an accelerator and then heating the sheet to a temperature which will cause vulcanization. If the vulcanized sheet is treated with a chemical solution such as caustic soda in the manner described, there is some increase in strength and softness; and the alkali tends to remove acidity or any excess sulphur. We do not herein claim per se the mechanical working of rubber-impregnated fibrous sheeting while wet, as this subject matter is disclosed and claimed in application Serial No. 358,745, filed April 27, 1929, by Roger B. Hill and John A. Fogarty.

We claim:

1. A process which comprises impregnating fibrous sheet material with rubber latex, drying, treating with a caustic soda solution to remove resins and proteins associated with the latex, mechanically working the sheeting while wet with the chemical solution, washing free of chemical solution, and drying.

2. A process which comprises impregnating fibrous sheet material with rubber latex, drying, treating with sulphur chloride to effect vulcanization, mechanically working the sheet while wet with caustic soda solution, washing free of chemical solution, and drying.

3. A process which comprises impregnating a felted fibrous sheet with rubber latex; drying the latex-impregnated sheet; mechanically working the dried, latex-impregnated sheet with an aqueous solution of a chemical selected from a group consisting of caustic soda, caustic potash, zinc chloride, calicum thiocyanate, and lithium thiocyanate to dissolve water-insoluble, non-rubber solids, including resins and proteins, and to cause them to appear on the surface of the sheet; washing the sheet free from chemical solution and dissolved solids; and drying the sheet.

In testimony whereof we have affixed our signatures.

GEORGE A. RICHTER.
WALLACE B. VAN ARSDEL.
ROGER B. HILL.